United States Patent [19]
Yamaguchi

[11] Patent Number: 4,798,639
[45] Date of Patent: Jan. 17, 1989

[54] METHOD OF LAMINATING PLASTIC RESIN SHEETS

[75] Inventor: Akira Yamaguchi, Saitama, Japan

[73] Assignee: Fuji Photo Film Co., Ltd., Kanagawa, Japan

[21] Appl. No.: 168,014

[22] Filed: Mar. 14, 1988

[30] Foreign Application Priority Data

Mar. 16, 1987 [JP] Japan ................. 62-059034

[51] Int. Cl.$^4$ ............................. B29C 27/08
[52] U.S. Cl. ..................... 156/73.1; 156/308.2; 156/219; 156/580.2; 156/581; 264/23
[58] Field of Search ............... 156/308.2, 73.1, 580.2, 156/581, 535, 73.4, 219; 264/23; 425/174.2

[56] References Cited

U.S. PATENT DOCUMENTS

| | | | |
|---|---|---|---|
| 3,499,808 | 3/1970 | Obeda | 264/23 |
| 3,602,257 | 8/1971 | Berleyoung | 264/23 |
| 3,635,609 | 1/1972 | Balamuth | 264/23 |
| 4,169,751 | 10/1979 | Yen | 156/73.1 |
| 4,230,757 | 10/1980 | Toner | 156/73.1 |
| 4,572,753 | 2/1986 | Bach | 156/580.2 |
| 4,618,516 | 10/1986 | Sager | 156/73.1 |

FOREIGN PATENT DOCUMENTS 1534265 11/1978 United Kingdom ................. 264/23

Primary Examiner—David A. Simmons
Assistant Examiner—J. Davis
Attorney, Agent, or Firm—Sughrue, Mion, Zinn, Macpeak & Seas

[57] ABSTRACT

In a method of laminating three or more thermoplastic resin sheets successively by sonic bonding, the pressure face of ultrasonic horn is provided with projections, and thereby the pressed surface of the thermoplastic resin sheet is provided with recesses and projections to the extent suitable for later sonic bonding. Accordingly, only one thermoplastic resin sheet having an embossed surface is needed, and both surfaces of the remaining thermoplastic resin sheets may be all flat. That is, when n sheets of thermoplastic resin sheet are laminated, heretofore, n−1 sheets of thermoplastic resin sheet need to have an embossed surface. Whereas, in the method of the invention, only one embossed thermoplastic resin sheet is sufficient so that the cost for embossing is much lowered, and thus the cost of manufacturing a laminate of thermoplastic resin sheets can be saved.

6 Claims, 4 Drawing Sheets

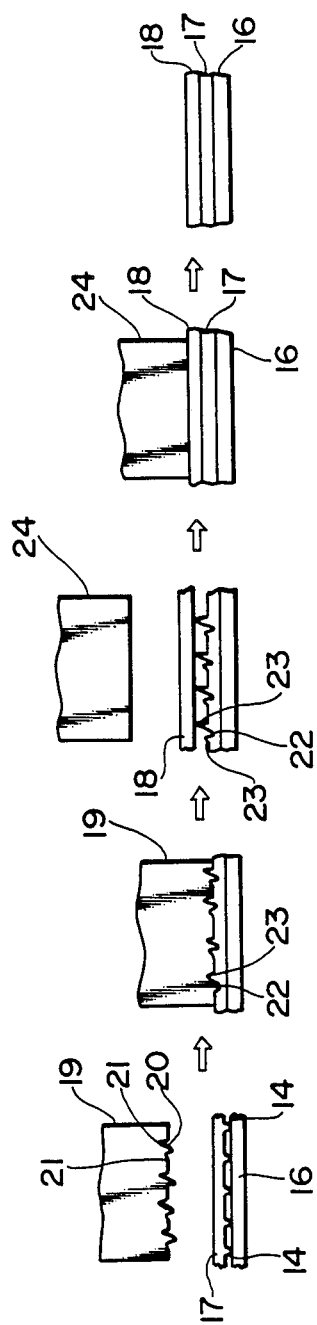

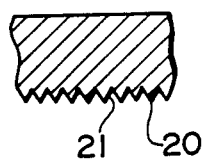
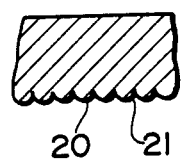
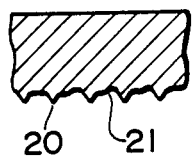
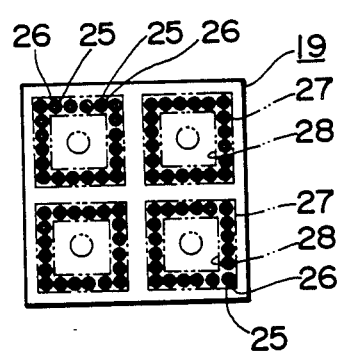
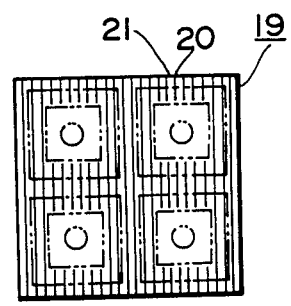
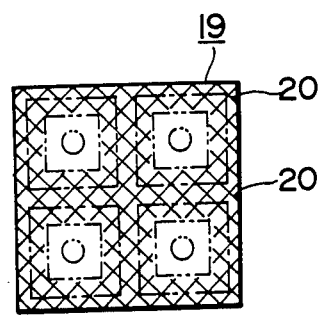
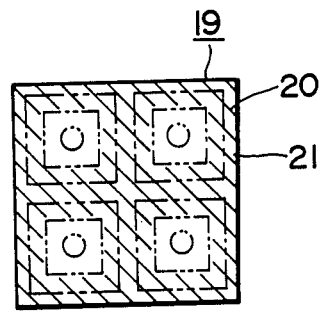

METHOD OF LAMINATING PLASTIC RESIN SHEETS

BACKGROUND OF THE INVENTION

This invention relates to a method of laminating three or more thermoplastic resin sheets by utilizing sonic bonding.

Recently, in clinical assay field, the advantages of the dry analysis using chemical analytical slide have been appreciated in simplicity and rapidity, and this method has widely been utilized.

In general, the chemical analytical slide is, as shown in FIG. 11, composed of upper frame sheet 1 and lower frame sheet 2 locating on the upside and the underside respectively, and middle frame sheet 3 and chemical analytical film 4 disposed therebetween. Upper frame sheet 1 is provided with a spotting aperture 5 for spotting sample liquid in the center, and lower frame sheet 2 is provided with a measuring aperture 6 for measuring the color produced in chemical analytical film 4 in the center. While, middle frame sheet 3 is provided with a film aperture 7 shaped to receive chemical analytical film 4. These three frame sheets are bonded to each other to form an integral element.

Upper frame sheet 1, middle frame sheet 3 and lower frame sheet 2 are, in general, made of plastic resin. Though these frame sheets may be produced by injection molding, the sheet web called "hoop material" is preferable in view of production efficiency. The state of manufacturing chemical analytical slides using plastic hoop materials is illustrated in FIG. 10. In the drawing, lower frame hoop material 9 is punched by a punching apparatus (not illustrated) to form measuring aperture 6, and while, middle frame hoop material 10 is also punched by a punching apparatus (not illustrated) to form film aperture 7. Then, middle frame hoop material 10 is thermally bonded to upper frame hoop material 9 at the first ultrasonic horn 12. Subsequently, chemical analytical film 4 is fitted in film aperture 7, and upper frame hoop material 11 provided with spotting aperture 5 by a punching apparatus (not illustrated) is thermally bonded to middle hoop material 10 at the second ultrasonic horn 13. The laminate of the hoop materials thus prepared is punched so that the chemical analytical slides are formed separately.

In this process, both of middle frame sheet web 10 and upper frame sheet web 11 have to be provided with projections on one surface respectively formed previously, for example, by embossing (as described in U.S. Pat. No. 4,230,757). As shown in FIG. 9, middle frame sheet web 10 was superposed on lower frame sheet web 9 having flat surfaces on both sides so as to face the embossed surface 14 of middle frame sheet web 10 to lower frame sheet web 9. Then, both web sheets were pressed to bond each other at the first ultrasonic horn 12. Upper frame sheet web 11 was then superposed on middle frame web sheet 10 to face the embossed surface 14 of upper frame web sheet 11 to middle frame web sheet 10, and they were bonded by the second ultrasonic horn 13 under pressure.

Since such a conventional method requires two sheet webs embossed previously and the equipment for embossing sheet webs in big, necessity of embossing process causes high cost of the method.

SUMMARY OF THE INVENTION

An object of the invention is to provide a method of laminating plastic resin sheets capable of decreasing the need of embossing process before the laminating and laminating efficiently in simple processes.

In the method of the invention, in order to achieve such an object, the pressure face of the ultrasonic horn for thermal bonding of thermoplastic resin webs stacked each other is provided with projections and recesses of small size and thereby the top surface of the thermoplastic resin sheet is provided with small projections after the thermal bonding of the webs.

Thus, the present invention provides a method of laminating three or more thermoplastic resin sheets successively by sonic thermal bonding comprising the steps of;

superposing a second thermoplastic resin sheet on a first thermoplastic resin sheet at least one of said thermoplastic resin sheets having an embossed surface and facing the embossed surface to the other thermoplastic resin sheet, pressing an ultrasonic horn having a pressure face provided with projections and recesses of small size onto said second thermoplastic resin sheet to bond it to the first thermoplastic resin sheet and to make the pressed surface of the second thermoplastic resin sheet with small projections, superposing a third thermoplastic resin sheet of which both surfaces are flat on said pressed surface of the second thermoplastic resin sheet, and pressing an ultrasonic horn onto said third thermoplastic resin sheet to bond it to the second thermoplastic resin sheet.

BRIEF DESCRIPTION OF THE DRAWINGS

FIG. 1 is a schematic view illustrating a procedure of the method of the invention.

FIGS. 2 to 4 are sectional views indicating various pressure faces of the ultrasonic horn used for the method of the invention.

FIGS. 5 to 8 are bottom plan views of various ultrasonic horns indicating the pressure face used for the method of the invention.

DETAILED DESCRIPTION OF THE INVENTION

Figure 9:
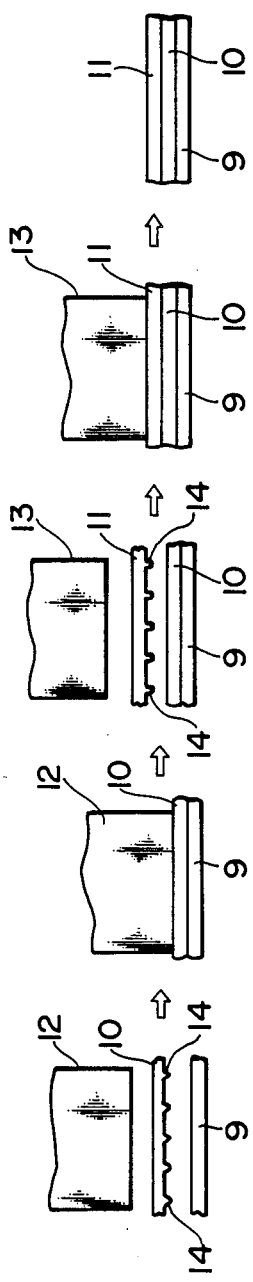
FIG. 9 is a schematic view illustrating a conventional laminating method.
Figure 10:
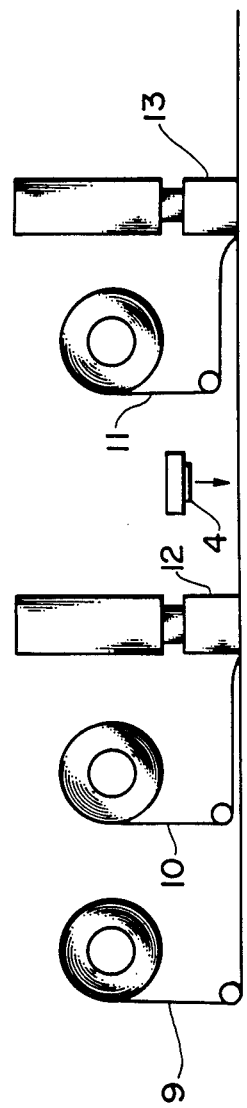
FIG. 10 is a schematic view illustrating a manufacturing process of chemical analytical slide to which the method of the invention is applicable.
Figure 11:
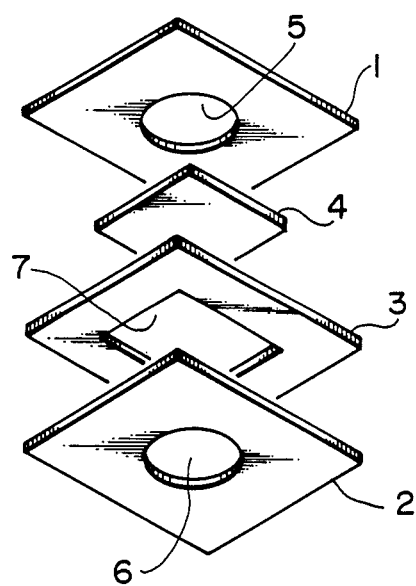
FIG. 11 is an exploded perspective view of a chemical analytical slide.

The thermoplastic resin sheets are made of the thermoplastic resin having a melting point capable of laminating by sonic bonding. Such a thermoplastic resin includes polystyrene, polyvinylchloride, polyethylene, polypropylene, polyamide, and various blended resins. Each thermoplastic resin sheet may be made of different resin capable of bonding together by fusion. The shape of each sheet may be square, or may be in the form of web. The thickness of each sheet is determined according to the use, etc., and respective sheets are not necessary to have the same thickness. The thickness is usually in the range of 0.1 to 3 mm.

One of the first thermoplastic resin sheet and the second thermoplastic resin sheet have an embossed surface prior to stacking. The remaining three surfaces need not be embossed, thus are usually flat.

The second thermoplastic resin sheet is superposed on the first thermoplastic resin sheet so as to face the embossed surface to the other thermoplastic resin sheet, and pressed by an ultrasonic horn having a pressure face provided with small projections, preferably with small projections and recesses. By the pressing, the superposed thermoplastic resin sheets are bonded to each other, and the pressed surface of the second thermoplastic resin sheet is provided with small recesses and projections, corresponding to the projections, or the projections and the recesses, on the ultrasonic horn.

The projections or irregularities on the pressure face of the ultrasonic horn are provided in order to form small projections on the surface of the second thermoplastic resin sheet by the pressing. Accordingly, it is sufficient to form the projections capable of bonding a third thermoplastic resin sheet to the second thermoplastic resin sheet by sonic bonding, and the sectional shape and surface shape of the projections or irregularities of the ultrasonic horn may be varied according to desired results. For example, the projections may have the form of cones such as circular cones, spherical cones and pyramids, mountain ranges, waves, irregular roughness and the like. In any event, it is preferable that projections and indentations are formed adjacent to each other and that each projection and indentation are close together so that the melted plastic material of each projection can extend to the indented portions. The height of protrusions and the depth of indentations are different depending on the thickness of the sheet, the kind of the thermoplastic resin composing the sheet, the shape of embossed pattern and the like, and it is usually 0.1 to 3 mm, preferably. Besides, the whole pressed surface is not necessary to have the projections and recesses, and when the second thermoplastic resin sheet is partially bonded to the first thermoplastic resin sheet, the protrusions and indentations are formed only in the portions to be bonded. The embossed surface previously formed of the first thermoplastic resin sheet or the second thermoplastic resin sheet is also sufficient to be embossed to the extent and in the portions described above.

Both surfaces of the third thermoplastic resin film may be flat. The third thermoplastic resin film is superposed on the pressed surface of the second thermoplastic resin sheet, and pressed by an ultrasonic horn to bond it to the second thermoplastic resin sheet. In the case where the object laminated sheet is composed of three sheet layers, the pressure face of the ultrasonic horn for bonding the third sheet to the second sheet may be flat as conventional one. In the case where the object laminated sheet is composed of four or more sheet layer, the ultrasonic horn having pressure face with protrusions is used for pressing all intermediate layers, and only the topmost layer may pressed by an ultrasonic horn having flat pressure face.

The ultrasonic horn used may be one, but ultrasonic horns corresponding to the number of laminating processs may be used.

In the laminating method of the invention, since every intermediate thermoplastic resin sheet is pressed by the ultrasonic horn having embossed pressure face with protrusions, the pressed face of the thermoplastic resin sheet is indented and protruded around the indentation by the pressing. Accordingly, the thermoplastic resin sheet having a previously embossed surface is sufficient to be one sheet, and both surfaces of the remaining thermoplastic resin sheets may be all smooth. Heretofore, when n sheets of thermoplastic resin sheet are laminated, n−1 sheets of thermoplastic resin sheet need to have embossed surfaces. Whereas, in the method of the invention, since only one embossed thermoplastic resin sheet is sufficient, the cost for embossing of the sheets is much lowered, and the cost of manufacturing a laminate of thermoplastic resin sheets can be remarkably saved.

EXAMPLES

An procedure of the laminating method of the invention is illustrated in FIG. 1. This drawing illustrates the processes to laminate three hoop materials(webs of extruded material) made of polystyrene to prepare chemical analytical slides. As shown in the drawing, both surfaces of lower frame sheet web 16 (first thermoplastic resin sheet) are flat, while underside of middle frame sheet 17 (second thermoplastic resin sheet) is embossed surface 14. Such middle frame sheet 17 is superposed on lower frame sheet web 16, and first ultrasonic horn 19 having pressure face with projections and recesses is pressed onto middle frame sheet web 17. Linear projections 20 and grooves 21 are formed contiguous to each other on the pressure face of horn 19 in parallel respectively. By the pressing under ultrasonic vibration, middle frame sheet web 17 is sonically bonded to lower frame sheet web 16, and linear grooves 22 and projections 23 are formed on the pressed surface of middle frame sheet web 17 by means of linear projections 20 and grooves 21 of horn 19. Subsequently, upper frame sheet web 18 (third thermoplastic resin sheet) of which both surfaces are flat is superposed on middle frame sheet web 17, and pressed by ultrasonic horn 24 having flat pressure face. Since upper frame sheet web 18 is in contact with middle frame sheet web 17 in lines by linear projections 23, the energy of ultrasonic wave is concentrated to projections 23 to melt them. Thermoplastic resin form the melted projections 23 fills at least a part of each groove 22, and upper frame sheet web 18 is bonded to middle frame sheet web 17. In the above procedure, spotting aperture 5, measuring aperture 6 and film aperture 7 of respective sheet webs 16, 17, 18 have been punched prior to lamination, and chemical analytical film 4 has also been fitted in film aperture 7 before sheet web 16 is covered with sheet web 17, similar to the conventional method described previously.

Various pressure faces of first ultrasonic horn 19 are shown in FIGS. 2 to 4. On the pressure face of FIG. 2, triangular linear projections 20 and grooves 21 are formed alternately and continuously. On the pressure face of FIG. 3, semicylindrical linear projections 20 are continuously formed with V-shaped grooves 21 interposed. On the pressure face of FIG. 4, sets of linear projections 20 and grooves 21 contiguous to each other are formed separately with same intervals.

The plan shapes of various pressure faces of first ultrasonic horn 19 are shown in FIGS. 5 to 8. On the pressure face of FIG. 5, mount-shaped projections 25 are formed at regular intervals in a row around the opening in the center of the middle frame sheet 3 of chemical analytical slide, and each projection 25 is encircled with a ring-shaped groove 26. In the drawing, 27 indicates punch line, and 28 indicates the edge of chemical analytical film 4. On the pressure face of FIG. 6, linear projections 20 and grooves 21 are alternately formed at regular intervals in parallel in the longitudinal direction of the hoop materials except respective chemical analytical film portions. On the pressure face of FIG. 7, linear projections 20 are formed at regular intervals in parallel in the two directions crossed at right angles, each inclined to the longitudinal direction at an angle of 45 degrees, except respective chemical analytical film portions. On the pressure face of FIG. 8, linear projections 20 and grooves 21 are alternately formed at regular intervals in parallel inclined to the longitudinal direction at an angle of 45 degrees, except respective chemical analytical portions.

I claim:

1. A method of laminating three or more thermoplastic resin sheets successively by sonic bonding comprising:

(1) superposing a first thermoplastic resin sheet on a second thermoplastic resin sheet, at least one of said themoplastic resin sheets having an embossed surface facing the other thermoplastic resin sheet, (2) pressing an ultrasonic horn having a pressure face having projections and recesses onto said first thermoplastic resin sheet to bond it to the second thermoplastic resin sheet and to provide the pressed surface of the first thermoplastic resin sheet with recesses and projections, (3) superposing a third thermoplastic resin sheet of which both surface are flat on said pressed surface of the first thermoplastic resin sheet, and, (4) pressing an ultrasonic horn onto said third thermoplastic resin sheet to bond it to the first thermoplastic resin sheet whereby ultrasonic energy is concentrated in the projections of the pressed surface of the first thermoplastic resin sheet.

2. The method of claim 1 wherein the shape of said projections on said pressure face of the ultrasonic horn is selected from the group consisting of cones, wedges, waves and irregular roughness.

3. The method of claim 1, wherein said ultrasonic horn for bonding said third thermoplastic resin sheet to the first thermoplastic resin sheet is provided with projections.

4. A method of laminating three or more thermoplastic resin sheets successively by sonic bonding comprising;

(1) superposing a first thermoplastic resin sheet on a second thermoplastic resin sheet, at least one of said thermoplastic resin sheets having an embossed surface facing the other thermoplastic resin sheet, (2) pressing an ultrasonic horn having a pressure face having projections onto said first thermoplastic resin sheet to bond it to the second thermoplastic resin sheet and to provide the pressed surface of the first thermoplastic resin sheet with recesses and projections, (3) superposing a third thermoplastic resin sheet of which both surfaces are flat onto said pressed surface of the first thermoplastic resin sheet, and (4) pressing an ultrasonic horn onto said third thermoplastic resin sheet to bond it to the first thermoplastic resin sheet whereby ultrasonic energy is concentrated in the projections of the pressed surface of the first thermoplastic resin sheet.

5. The method of claim 4 wherein the shape of said projections on said pressure face of the ultrasonic horn is selected from the group consisting of cones, wedges, waves and irregular roughness.

6. The method of claim 4, wherein said ultrasonic horn for bonding said third thermoplastic resin sheet to the first thermoplastic resin sheet is provided with projections.

* * * * *